(12) United States Patent
Kresse et al.

(10) Patent No.: US 6,726,596 B2
(45) Date of Patent: Apr. 27, 2004

(54) ENGINE CONTROL METHOD RESPONSIVE TO TRANSMISSION RANGE CHANGING

(75) Inventors: John P. Kresse, Martinsville, IN (US); Jeffrey Kurt Runde, Fishers, IN (US); Scott Thomas Kluemper, Monrovia, IN (US); Kevin L. Kluemper, Monrovia, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/200,572

(22) Filed: Jul. 22, 2002

(65) Prior Publication Data
US 2004/0014562 A1 Jan. 22, 2004

(51) Int. Cl.[7] .............................................. F16H 61/00
(52) U.S. Cl. ....................................... 477/116; 477/109
(58) Field of Search .......................... 477/70, 83, 109, 477/110, 116; 701/54, 67

(56) References Cited

U.S. PATENT DOCUMENTS

| | | | |
|---|---|---|---|
| 5,046,178 A | | 9/1991 | Hibner et al. ............. 364/424.1 |
| 5,795,262 A | * | 8/1998 | Robinson ................. 477/116 X |
| 5,833,572 A | | 11/1998 | Leising et al. ............... 477/113 |
| 5,855,533 A | * | 1/1999 | Tolkacz et al. .............. 477/110 |
| 5,947,856 A | * | 9/1999 | Tabata et al. ................ 475/128 |
| 6,007,450 A | * | 12/1999 | Raghavan et al. ........... 475/286 |
| 6,558,293 B2 | * | 5/2003 | Skupinski et al. ............. 477/97 |

FOREIGN PATENT DOCUMENTS

| | | | |
|---|---|---|---|
| DE | 10225655 | * | 12/2002 |
| JP | 404210155 | * | 7/1992 |

* cited by examiner

*Primary Examiner*—Ha Ho
(74) *Attorney, Agent, or Firm*—Leslie C. Hodges

(57) ABSTRACT

An engine control for a motor vehicle powertrain coordinates engine speed and torque limiting during automatic transmission range changing so as to provide both vehicle rocking capability and adequate protection for the transmission. A transmission controller temporarily limits the engine speed to a predetermined value on each transition to or from the forward or reverse ranges, and superimposes continuous engine speed and torque limitations when an abusive rocking maneuver is detected. An abusive rocking maneuver is detected when the driver commands at least a specified number of successive range shifts during a predetermined time interval, and the speed and torque limitations are imposed until range shifting is discontinued for at least a calibrated period of time.

6 Claims, 3 Drawing Sheets

| RANGE \ CLUTCH | C1 | C2 | C3 | C4 | C5 |
|---|---|---|---|---|---|
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X |

ENGINE CONTROL METHOD RESPONSIVE TO TRANSMISSION RANGE CHANGING

TECHNICAL FIELD

This invention relates to an integrated powertrain control for a motor vehicle, and more particularly to an engine control method that limits engine output torque and speed during transmission range changing.

BACKGROUND OF THE INVENTION

The range selector of a vehicle equipped with an automatic transmission allows the driver to shift the transmission from neutral to the forward or reverse speed ranges. Such range changes usually occur in the context of a so-called garage shift at the initiation of vehicle operation, or when it is necessary to temporarily reverse the direction of vehicle movement during parking, for example. In these situations, the engine speed and torque are typically very low, and the transmission clutch pressures may be tailored to provide a smooth engagement; see, for example, the U.S. Pat. No. 5,046,178 to Hibner et al., assigned to the assignee of the present invention. However, range changes also occur during a rocking maneuver when attempting to free a vehicle that is stuck in snow or soft ground. In this situation, the engine speed and torque may be quite high, to the point of being abusive, and some sort of interventionary control may be needed to prevent damage to the transmission and drivetrain. One example of such a control is described in the U.S. Pat. No. 5,833,572 to Leising et al., where the engine speed or torque is reduced to limit the transmission input speed during the engagement of a transmission range clutch if the time in neutral is short and the engine throttle setting during the neutral condition is above a predetermined value. Alternatively, potentially damaging range shifts can be avoided simply by inhibiting range shifting when the engine speed is above a calibrated value. While such controls may prevent transmission damage, they seriously and unnecessarily limit the rocking capability of the vehicle. Accordingly, what is needed is a control method that limits engine torque in a way that protects the transmission during range changing without unnecessarily limiting the rocking capability of the vehicle.

SUMMARY OF THE INVENTION

The present invention is directed to an improved and coordinated engine control for a motor vehicle including an automatic transmission, where the control coordinates engine speed and torque limits during transmission range changing so as to provide both vehicle rocking capability and adequate protection for the transmission. According to the invention, the transmission controller temporarily limits the engine speed to a predetermined value on each transition from neutral to the forward or reverse ranges, and superimposes continuous engine speed and torque limitations when an abusive rocking maneuver is detected. An abusive rocking maneuver is detected when the driver commands at least a specified number of successive range shifts during a predetermined time interval, and the speed and torque limitations are imposed until range shifting is discontinued for at least a calibrated period of time.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further detail regarding the fluid pressure routings and so forth may be found in the aforementioned patents.

Figures 1, 2:
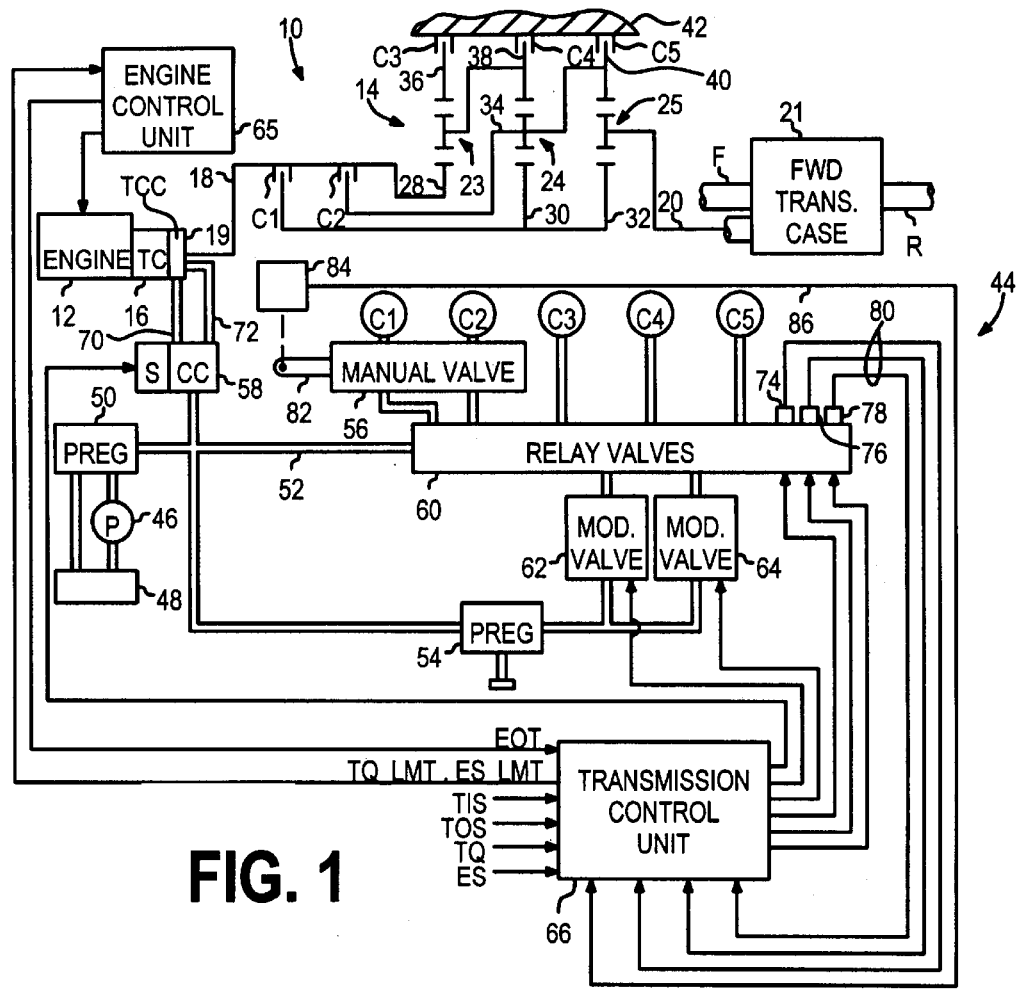
FIG. 1 is a diagram of a motor vehicle powertrain including an engine, an automatic transmission, a microprocessor-based transmission control unit, and a microprocessor-based engine control unit.
FIG. 2 is a table indicating a relationship between transmission clutch activation and corresponding speed ratio.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagramed in FIG. 2, the state of the clutches C1–C5 (i.e., engaged or disengaged) can be controlled to provide six forward gears (1, 2, 3, 4, 5, 6), a reverse gear (R) or a neutral condition (N). As indicated, only clutch C5 is engaged during the neutral (N) condition; a neutral-to-drive range shift is carried out by engaging clutch C1 to establish the first forward gear, and a neutral-to-reverse range shift is carried out by engaging clutch C3 to establish the reverse (R) gear.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 activated by a driver-manipulated shift selector (not shown) via linkage arm 82 and a number of solenoid operated fluid control valves 58, 60, 62, 64.

The electronic portion of the control is primarily embodied in the engine control unit (ECU) 65 and the transmission control unit (TCU) 66, illustrated in FIG. 1 as two separate modules. Both control units 65, 66 are microprocessor-based, and may be conventional in architecture. The ECU 65 controls the operation of engine functions such as fuel, spark timing, and so on depending on the control variables afforded by engine 12, and the TCU 66 controls the solenoid operated fluid control valves 58, 60, 62, 64 based on a number of inputs to achieve a desired transmission speed ratio. The inputs to TCU 66 include signals representing the transmission input speed TIS, engine speed ES, a driver torque request TQ, and the transmission output speed TOS. Sensors for developing such signals may be conventional in nature, and have been omitted for simplicity. Additionally, ECU 65 supplies an engine output torque signal EOT to TCU 66, and TCU 66 supplies torque and speed limit commands TQ_LMT, ES_LMT to ECU 65.

The linkage arm 82 of manual valve 56 is coupled to a sensor and display module 84 that produces an diagnostic signal on line 86 based on the control lever position; such signal is conventionally referred to as a PRNDL signal, since it indicates which of the transmission ranges (P, R, N, D or L) has been selected by the driver-manipulated shift selector. Finally, the fluid control valves 60 are provided with pressure switches 74, 76, 78 for supplying diagnostic signals to TCU 66 on lines 80 based on the respective relay valve positions. The TCU 66, in turn, monitors the various diagnostic signals for the purpose of electrically verifying proper operation of the controlled elements.

The solenoid-operated fluid control valves 58, 60, 62, 64 are generally characterized as being either of the on/off or modulated type. To reduce cost, the electro-hydraulic control system 44 is configured to minimize the number of modulated fluid control valves, as modulated valves are generally more expensive to implement. To this end, the Relay Valves 60 comprise a set of three on/off valves that are utilized in concert with manual valve 56 to enable controlled engagement and disengagement of each of the clutches C1–C5 with only two modulated valves 62, 64. For any selected gear, TCU 66 activates a particular combination of Relay Valves 60 for coupling one of the modulated valves 62, 64 to the on-coming clutch, and the other modulated valve 62, 64 to the off-going clutch. The modulated valves 62, 64 each comprise a conventional pressure regulator valve biased by a variable pilot pressure that is developed by current controlled force motor. The fluid-controlled valve (CC) 58 is also a modulated valve, and controls the supply fluid supply path to converter clutch 19 in lines 70, 72 for selectively engaging and disengaging the converter clutch 19. The TCU 66 determines pressure commands for smoothly engaging the on-coming clutch while smoothly disengaging the off-going clutch, develops corresponding force motor current commands, and then supplies current to the respective force motors in accordance with the current commands.

The present invention is particularly directed to a control method carried out by TCU 66 for limiting the speed and output torque of engine 12 during vehicle rocking maneuvers when the driver manipulated range selector is successively shifted between the Reverse and Drive settings to dislodge a vehicle stuck in snow or muddy ground. In such situations, the engine speed and torque may be quite high, to the point of being abusive, and the control of this invention imposes coordinated engine speed and output torque limitations in a way that protects the transmission 14 without unnecessarily limiting the rocking capability of the vehicle. According to the invention, the engine speed limit signal ES_LMT temporarily limits the engine speed ES to a predetermined value such as 1500 RPM on each transition from neutral to the forward/Drive (F) or reverse (R) ranges, and when an abusive rocking maneuver is detected, the speed and torque limit signals ES_LMT and TQ_LMT are continuously activated to superimpose additional engine speed and torque limitations. The TCU 66 detects the existence of an abusive rocking maneuver when at least a specified number of successive range shifts occur during a predetermined time interval, and the superimposed speed and torque limitations are maintained until range shifting is discontinued for at least a calibrated period of time such as 3 seconds. The superimposed engine speed limitation is higher than the temporarily imposed range change limitation to provide significant rocking capability without risking transmission damage.

Figure 3:
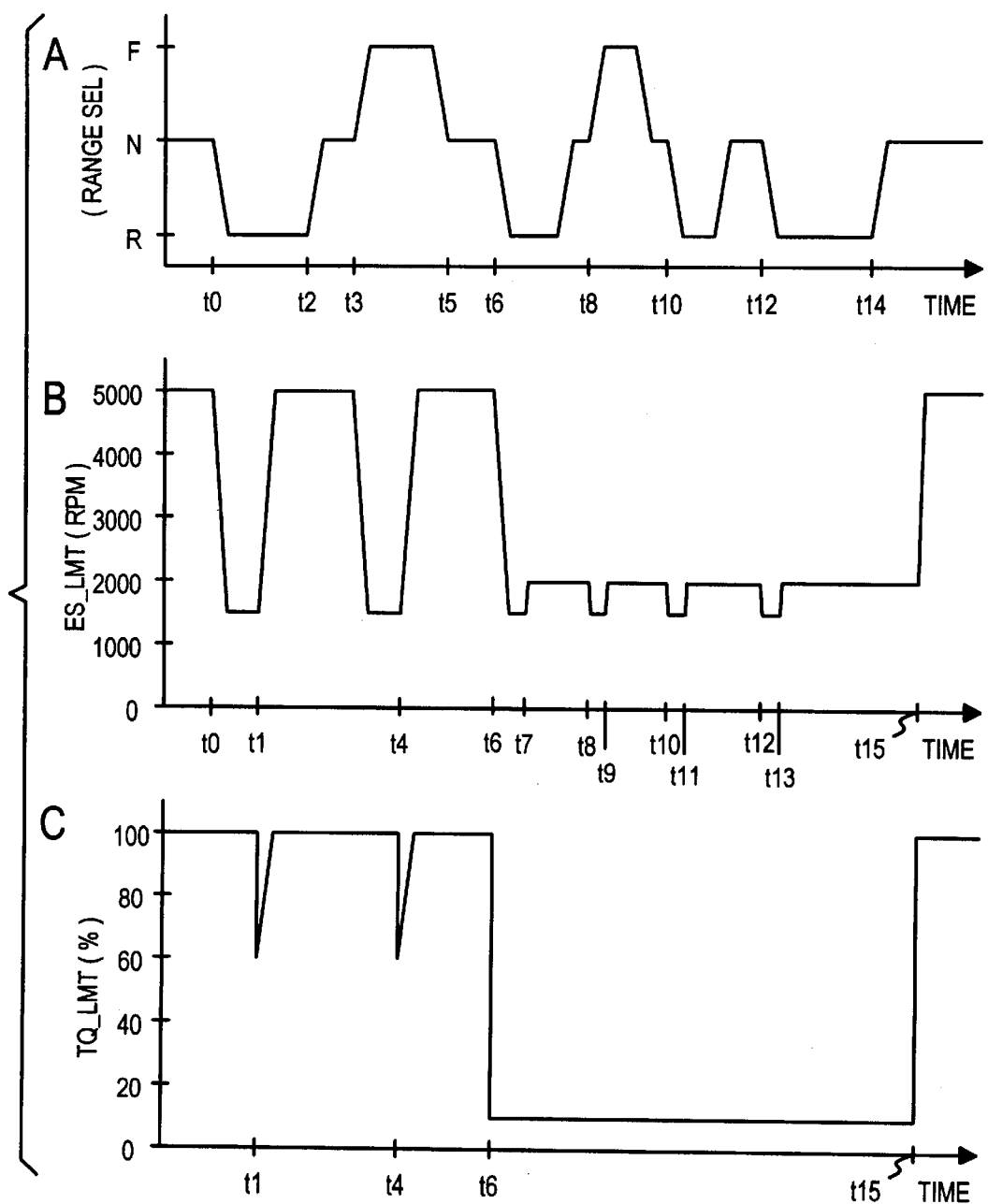
FIG. 3, Graphs A, B and C, illustrate the operation of this invention. Graph A depicts the position of a driver manipulated range selector during a rocking maneuver, and Graphs B and C respectively depict engine speed and torque limitations imposed by the transmission control unit of FIG. 1 according to this invention.

The above-described control is illustrated by Graphs A, B and C of FIG. 3, where Graph A depicts the movement of manual valve linkage arm 82 over a period of time, Graph B depicts the engine speed limit signal ES_LMT, and Graph C depicts the engine torque limit signal TQ_LMT. It is assumed that for at least several seconds prior to time T0, the arm 82 is in the neutral position (N). Beginning at time T0, the arm 82 is moved from N to the reverse position (R); this initiates a temporary engine speed limitation, wherein ES_LMT is quickly ramped down from a normal default value such as 5000 RPM to a range change limit of 1500 RPM. The TCU 66 delays engagement of the reverse on-coming clutch C3 until time T1 when the measured engine speed ES approaches the range change limit, and then temporarily reduces TQ_LMT to prevent a large torque increase during clutch engagement. When engagement of the on-coming clutch is detected (by turbine speed pull-down, for example), ES_LMT is quickly ramped back up to the normal default value. Beginning at time T2, the arm 82 is moved out of the R position, briefly to the N position, and then to the forward (Drive) range position F; this initiates a similar activation of the engine speed limit ES_LMT when the arm 82 is shifted out of N at time T3. In this case, TCU 66 delays engagement of the forward ($1^{st}$ gear) on-coming clutch C1 until time T4 when the measured engine speed ES approaches the range change limit of 1500 RPM, and then temporarily reduces TQ_LMT to prevent a large torque increase during clutch engagement. When engagement of the on-coming clutch is detected (by turbine speed pull-down, for example), ES_LMT is quickly ramped back to the default value. Beginning at time T5, the arm 82 is moved out of the F position, briefly to the N position, and then to the R position; this initiates a similar activation of the engine speed limit ES_LMT when the arm 82 is shifted out of N at time T6. At time T6, the TCU 66 additionally detects the existence of an abusive rocking maneuver, defined by the occurrence of at least three range change shifts within a predefined interval such as 5 seconds. Requiring at least three range shifts within a reference interval ensures that an abusive rocking maneuver will not be detected in normal vehicle operation where the reverse range is initially engaged to back out of a parking space, and the forward range is subsequently engaged to drive away. When an abusive rocking maneuver is detected, the TCU 66 ramps the default value of ES_LMT down to a predefined abuse protection value such as 2000 RPM, and additionally reduces TQ_LMT from a default value (100%) to a predefined abuse protection value such as 10%. During the abusive rocking condition, ES_LMT is still reduced to the range change limit of 1500 RPM at each transition from neutral to forward or reverse, as seen at times T6, T8, T10 and T12, but is only returned to the abuse protection value of 2000 RPM once the selected range clutch is engaged, as seen at times T7, T9, T11 and T13. Significantly, the abuse protection value (2000 RPM) is higher than the range change limit (1500 RPM) to afford a predefined level of rocking ability, but without risking damage to the transmission 14. The abusive rocking maneuver speed and torque limits are maintained until an exit condition is met, after which ES_LMT and TQ_LMT are returned to their normal default settings. In the illustrated embodiment, the exit condition occurs at time T15, when there have been no range changes for at least a calibrated time interval such as three seconds.

Figure 4:
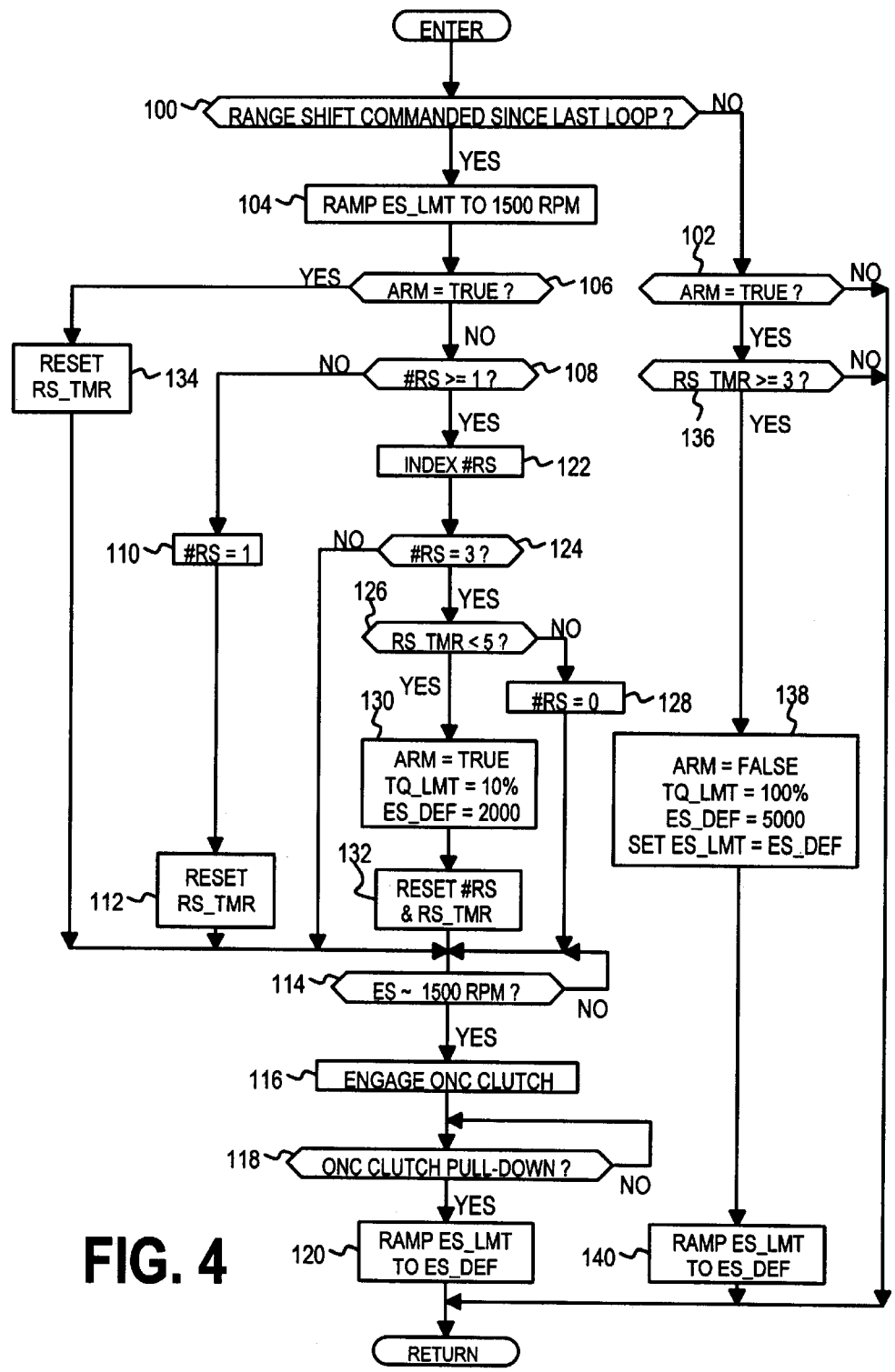
FIG. 4 is a flow diagram representative of computer program routine executed by the transmission control unit of FIG. 1 in carrying out the control of this invention.

The flow diagram of FIG. 4 represents a software routine periodically executed by TCU 66 to carry out the foregoing control method. At each execution of the routine, the block 100 is initially executed to determine if a range shift (that is neutral-to-drive or neutral-to-reverse) has been commanded since the last execution of the routine. If not, block 102 determines if an abusive rocking maneuver is in effect, as designated by the status of the ARM flag. Initially, the ARM flag will be False, indicating that an abusive rocking maneuver is not in effect, and the routine is exited. If block 100 determines that a range shift has been commanded since the last execution of the routine, the blocks 104 and 106 are executed to ramp ES_LMT down to the range change limit of 1500 RPM, and to check the status of the ARM flag. Initially the ARM flag will be False, as mentioned above, and the block 108 is executed to determine if a range shift counter (designated as #RS) is one or higher. Since variables such as #RS are initialized to zero at engine start-up, block 108 is initially answered in the negative, and blocks 110 and 112 are executed to set #RS to one (to count the range shift that was commanded since the last execution of the routine), and to reset a range shift timer (designated at RS_TMR) to zero. As explained below, the range shift timer is a free-running timer that is occasionally reset to zero by the routine of FIG. 4 to time one or more predetermined intervals. Thereafter, the blocks 114, 116, 118 and 120 are executed to engage the oncoming (ONC) clutch when the engine speed ES approaches the range change limit of 1500 RPM, and to ramp ES_LMT back to a default value ES_DEF when a turbine speed pull-down associated with on-coming clutch engagement is detected, completing the routine. The default engine speed limit ES_DEF may be initialized at engine start-up to a high value such as 5000 RPM, as explained above in reference to FIG. 3.

When block 100 is subsequently answered in the affirmative due to additional range shift commands, block 108 is answered in the affirmative, and block 122 is executed to index or increment #RS to count the range shift. When #RS reaches three, as detected by block 124, the block 126 is executed to determine if the range shift timer RS_TMR is less than a predetermined value such as five seconds. If not, an abusive rocking maneuver is not detected, and the block 128 resets #RS to zero, which will bring blocks 108, 110 and 112 into play when another range shift is commanded, as explained above. If block 126 is answered in the affirmative, an abusive rocking maneuver is detected, and the block 130 is executed to set the ARM flag to True, to set TQ_LMT to 10%, and the lower the default engine speed limit from its normal value of 5000 RPM to the abuse protection value of 2000 RPM. Thus, when block 120 is executed upon a detected turbine speed pull-down, ES_LMT is ramped up to the abuse protection value of 2000 RPM instead of the normal default value of 5000 RPM. Additionally, block 132 resets #RS and RS_TMR to zero to initialize such variables for detecting the abusive rocking maneuver exit conditions.

When block 100 is subsequently answered in the affirmative due to additional range shift commands, block 106 is answered in the affirmative, and the block 134 resets RS_TMR to zero, since the exit condition requires a period of time (such as three seconds) with no range shifting. If no range shift has been commanded since the previous execution of the routine, block 102 will now be answered in the affirmative, and the block 136 determines if RS_TMR indicated that three seconds or longer have elapsed with no range shifting. If so, the block 138 is executed to set the ARM flag to False, to return TQ_LMT to 100%, to return the default speed limit ES_DEF to 5000 RPM, and to set ES_LMT equal to ES_DEF, completing the routine.

In summary, the method of the present invention provides an improved and coordinated engine speed and torque limit control during transmission range changing so as to provide a satisfactory level of vehicle rocking capability without risking damage to the transmission 14. While the invention has been described in reference to the illustrated embodiment, it is expected that various modifications in addition to those mentioned above will occur to those skilled in the art. For example, the various predefined time intervals may be adjusted as required for a given application, and so on. Thus, it will be understood that methods incorporating these and other modifications may fall within the scope of this invention, which is defined by the appended claims.

What is claimed is:

1. A control method for a motor vehicle powertrain including an engine driving an automatic shift transmission that selectively provides a neutral condition, a reverse range and a forward range in response to shift commands, the method comprising the steps of:

temporarily limiting a speed of the engine to a predetermined value on each shift from the neutral condition to the forward or reverse ranges;

counting shifts from the neutral condition to the forward or reverse ranges, and detecting that an abusive rocking maneuver is in effect when at least a specified number of shifts are counted within a predefined time interval; and when the abusive rocking maneuver is detected, limiting an output torque of the engine and imposing an abuse protection default limit on the speed of the engine.

2. The control method of claim 1, including the steps of:

detecting that the abusive rocking maneuver is no longer in effect when no shifts from the neutral condition to the forward or reverse ranges are counted for at least a calibrated period of time, and then removing limitation of engine output torque and the default limit on the speed of the engine.

3. The control method of claim 1, where said default limit on the speed of the engine is higher than said predetermined value.

4. The control method of claim 1, including the steps of:

counting range shift commands for shifting the transmission from the neutral condition to the forward or reverse ranges; and delaying engagement of a clutch associated with a counted range shift command until the speed of the engine is substantially at or below said predetermined value.

5. The control method of claim 1, wherein the step of temporarily limiting the speed of the engine comprises the steps of:

setting an engine speed limit to the predetermined value in response to a commanded shift from the neutral condition to the forward or reverse ranges; and setting the engine speed limit to a default value upon initiation of said commanded shift.

6. The control method of claim 5, including the step of:

reducing said default value to said abuse protection default limit so long as said abusive rocking maneuver is detected.

* * * * *